Figure 1:
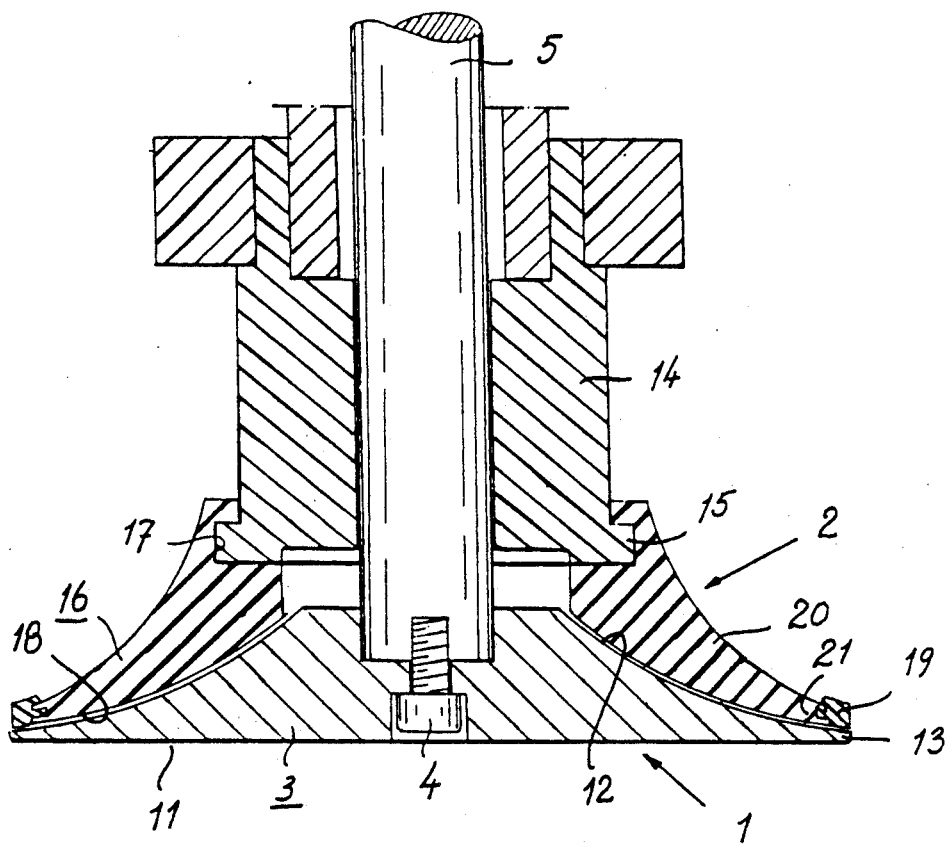

United States Patent [19]

Berg et al.

[11] Patent Number: 4,989,394
[45] Date of Patent: Feb. 5, 1991

[54] PRESS PLUNGER HAVING SEPARABLE PRESS RING

[75] Inventors: Gunnar Berg, Lidingö; Torkel Johansson; Bo Sjogren, both of Bromma, all of Sweden

[73] Assignee: Akerlund & Rausing Licens Aktiebolag, Jarfalla, Sweden

[21] Appl. No.: 439,781

[22] Filed: Nov. 21, 1989

[30] Foreign Application Priority Data

Nov. 23, 1988 [SE] Sweden ............................... 8804230

[51] Int. Cl.$^5$ ........................... B65B 7/28; B67B 1/00; B67B 3/16; B67B 5/00
[52] U.S. Cl. ...................................... 53/330; 53/357; 53/361
[58] Field of Search ................. 53/330, 352, 353, 357, 53/362, 319, 345, 361

[56] References Cited

U.S. PATENT DOCUMENTS

| 808,833 | 1/1906 | Golstein | 53/330 |
| 2,085,879 | 7/1937 | Trump | 53/330 |
| 2,423,965 | 7/1947 | Coyle | 53/362 X |
| 4,640,733 | 2/1987 | Borgren | 53/362 X |
| 4,724,654 | 2/1988 | Dahlin et al. | 53/330 |

Primary Examiner—Horace M. Culver

[57] ABSTRACT

A radially expansible press plunge comprising two main parts named formation part (1) and expansion part (2) which are movable in relation to each other, and in which the expansion part (2) is arranged to provide an expansion of at least some part (16) of the press plunge when the said main parts (1, 2) are moved together, and in which the expansion part (2) comprises a cup formed expansion body (16), and in which the formation part (1) is designed with a formation surface (12) against which at least parts of the expansion body (16) is adapted to slide when the formation part (1) and the expansion part (2) are moved axially towards each other, and in which the expansion part (2) is materially composed of two different portions, namely an outer press portion (19) for executing the actual radially outwards directed contact pressure of the press plunge and consisting of a wear resistant, temperature resistant and elastic material, and an inner carrier portion (20) of a relatively hard, elastic material, preferably a material having a relatively low coefficient of friction, which carrier portion (20) carries the press portion (19).

10 Claims, 2 Drawing Sheets

PRESS PLUNGER HAVING SEPARABLE PRESS RING

The present invention generally relates to a press plunger for pressing, by a radially outwards directed press force, the edges of a lid or end sealing member having an upwardly folded rim or edge, against the inner surfacs of a container tube or a similar object and for maintaining the lid rim or edge pressed to the container sleeve while welding the two objects together by means of constant heat welding, high frequency welding or ultra sonar welding, and whereby said two objects are kept pressed together until the weld joint is finished and and has at least started becoming cooled.

More particularly the invention is concerned with a radially expandable press plunger comprising two parts which are axially movable in relation to each other and which are named formation part and expansion part, and in which the expansion part, for the purpose of compressing the two objects, is arranged to provide an expansion of at least some part of the press plunger, and in which the expansion part comprises a cup formed expansion part body, and in which the formation part provides a formation surface against which at least a portion of the expansion part slides upon axial displacement of the formation part in relation to the expansion part.

A press plunge of the above mentioned type is known from U.S. Pat. No. 4,724,654 to Dahlin, assigned to the assignee of the present invention, which discloses a press plunge of the above mentioned type in which the expansion part comprises a cup formed elastic disc which upon axial moving together of the expansion part and the formation part expands radially outwards in all directions thereby pressing the lid rim against the inner surfaces of a container sleeve.

The apparatus shown and described in the said U.S. patent operates well, but some problems may appear. For instance, when replacing the expansion part several different working operations are necessary for dismounting and remounting of certain parts of the press plunger, and there are also problems in finding a unitary material which fulfils the several demands on the material of the expansion part, for instance that the material is wear resistant, that the material has a sufficient strength and stability for the intended press operation, that the material has a desired elasticity and flexibility, that the material gives a low friction at the contact between the cooperating surfaces of the expansion part and the formation part, and in front of all that the material has a sufficient temperature resistance for standing the temperatures which appear during the welding operation, which temperatures are often relatively high.

A replacement of a worn out expansion part in the known apparatus is a relatively time consuming and expensive operation since several different mounting parts and the expansion part itself have to be dismounted and have to be remounted, during which moment the packing machine, to which the press plunger is connected, necessarily must be standing unoperable. Further, the expansion part many times is an expensive machine part.

In the known apparatus it may sometimes also happen that dirt and dust enters between the expansion part and the formation part. It also may happen that some parts of the expansion part, which are made of a relatively soft material, buckle upon expansion thereby giving an unsufficient pressure against the lid rim.

It has been difficult to find a material which fulfils the many above mentioned specific demands. For instance, the mechanical strength generally is reduced following an increase in temperature, and therefore attempts have been made, with only little success, to find a reasonable compromises between mechanical strength and temperature resistance of the expansion part.

Hence, the object of the invention is to solve the problem of providing a press plunger of the above mentioned type which is formed so that the press plunger does not need to be dismounted for replacement of a worn out expansion part, in which a replacement of worn out parts is made quicker and more easy and to less costs than in previously known apparatus, in which it has been possible, without any compromises, to combine the different demands on a well operating expansion part in an optimum way, and in which the expansion part thus has an improved temperature resistance and an improved wear resistance, at the same time as it has been possible to make the expansion part strong, durable and having the desired flexibility.

The said objects are fulfilled, in the first place in that the expansion part is composed of two different materials, namely with an outer material part or press part, preferably formed as a press ring, and adapted to execute the actual radially outwards directed press force and comprising a wear resistant, temperature resistant and elastic material, and an inner material part named carrier part of a relatively hard, elastic material, preferably having a low friction of coefficiency, which carrier part carries the outer press part.

Further characteristics of the invention will be evident by the study of the following detailed specification, in which reference will be made to the accompanying drawings.

Figure 2:
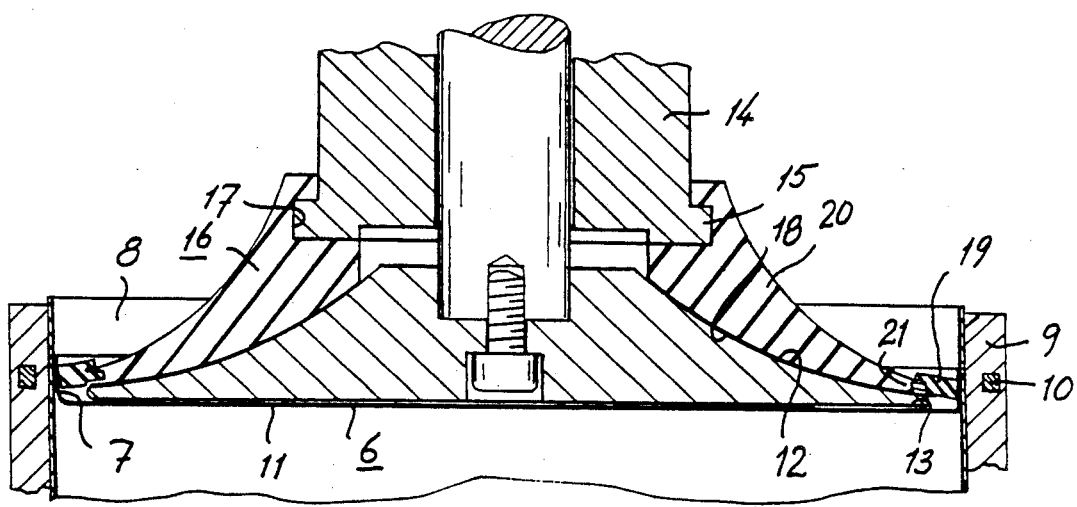
Figure 3:
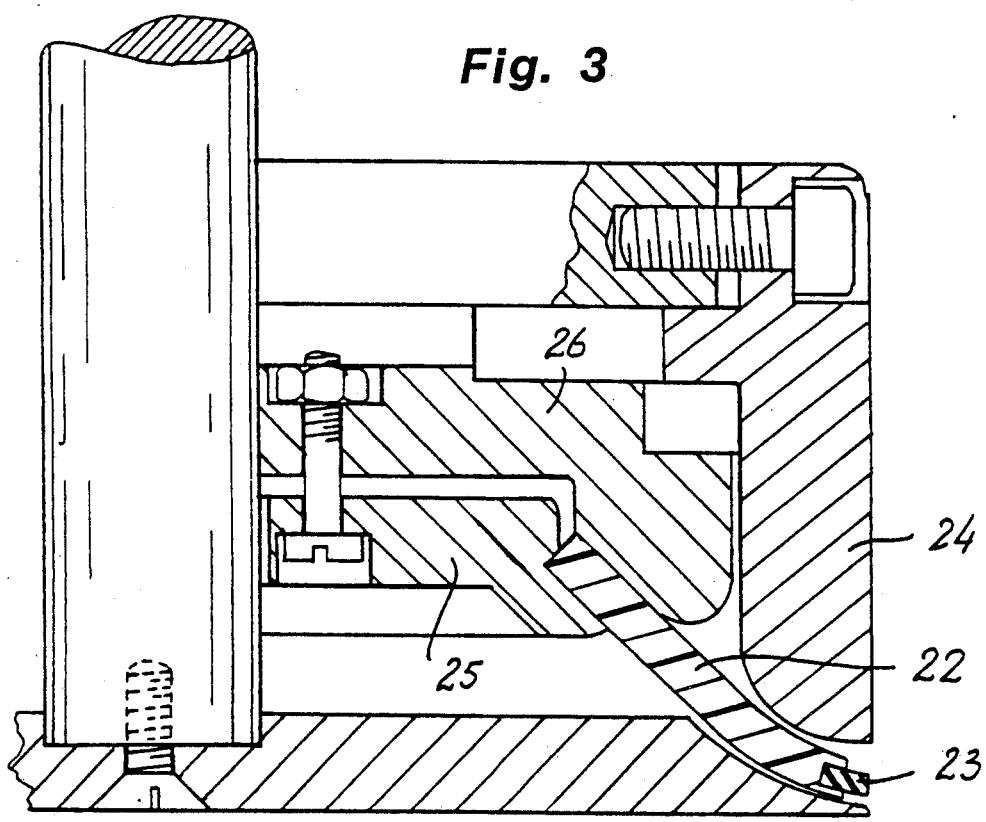

In the drawings FIG. 1 shows an axial cross section through a press plunger according to the invention in a non-operative condition, and FIG. 2 shows the same press plunger in an active condition and with slightly exaggerated dimensions for the sake of clearness. FIG. 3 shows an alternative embodiment of a press plunger according to the invention, and FIGS. 4 and 5 fragmentary show a couple of detail embodiments of a part of the invention FIGS. 1 and 2 show a detail of a press plunger according to the invention, which generally comprises a formation part 1 and an expansion part 2, which parts are axially displacable in relation to each other.

The formation part 1 comprises a formation plate 3 which by means of a screw 4 is mounted at the bottom part of a shaft 5 by means of which the entire press plunger can be moved between a non-operative, retracted condition as shown in FIG. 1 and an active press position which is illustrated in FIG. 2, and in which the press plunge is moved down into an end sealing member 6 having upwardly folded rims or edges 7, which end sealing 6 in turn is moved down a slight distance into the upper end of a container sleeve 8. The end sealing member 6 is intended to be welded inside the container sleeve 8, and for this purpose at least one of the two surfaces of the sleeve and the end sealing member facing each other is formed with a weldable layer of material, for instance a weldable plastic layer. In the case illustrated in FIG. 2 the welding is intended to be made by means of high frequency currency, and to this end the container sleeve 8 is carried inside a welding tool 9 having high frequency coils 10 provided therein, which coils are to be positioned on level with the parts of the end sealing 6 (the rim) and the sleeve 8 to be weld joined. The joining of the said part can be made by ultra sonar welding or contant heat welding instead of by high frequency welding. The welding method and the apparatus for the welding are known and are not to be described in detail.

The formation plate 3 has an even bottom surface 11 and it has a periphery the shape of which substantially coincides with the cross section shape of the container to be sealed, and the size of which is slightly less than the inner dimension of the fold up edges 7 of the end sealing member. The upper surface of the formation plate is formed as a guide surface 12 for the expansion part 2 and for this purpose it is formed as a successively downwards-outwards bow-formed cone surface which meets the bottom surface 11 over a relatively narrow edge 13. The tangent at the outermost part of said guide surface 12 extends nearly horizontally or only slightly obliquely downwards. The shape of the guide surface 12 may be a radius, but it may, as desired, be formed as any other bow-formed cone surface.

Figure 4:
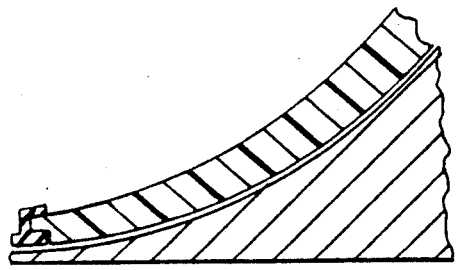
Figure 5:
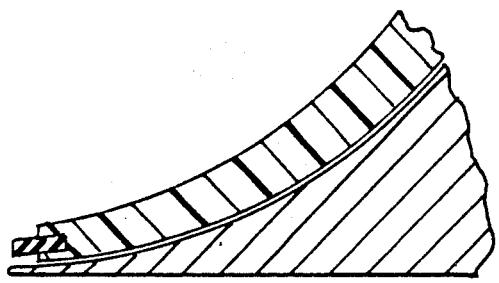

The expansion part 2 comprises a carrier 14 which is axially displacable on the shaft 5 by means of a (not illustrated) displacement mechanism, and which on an outwardly projecting flange 15 at the lower part thereof carries an expansion body 16 via a corresponding recess 17 in the centre of the expansion body. The expansion body is formed as a downwards-outwards conically formed cup, the bottom surface 18 of which preferably is formed as a straight cone or a bow-formed cone, similarly to the cone surface 12 of the formation part 3, but in which the cone surfaces 12 and 18 of the expansion body and the formation body respectively provide a little space therebetween in the inoperative position of the press plunger. The expansion body may have a radially outwards successively reduced thickness as shown in FIGS. 1 and 2, but if desired it may as well have a substantially even thickness as shown in FIGS. 3, 4 and 5. In the inoperative position of the expansion body 2 the outer edge thereof should be located retracted to a position on line with or inside the outer edge 13 of the formation part 3 so as not to prevent an introduction of the press plunger in a lid rim, or prevent a formation of a lid by pressing a plane lid blank down through a formation ring so as to form the lid with an all around extending rim.

It is important to the invention that the expansion part, or the expansion body 16 as shown in FIGS. 1 and 2, is composed by two different materials, namely such as to form an outer press portion press ring 19 for executing the actual radially outwards directed pressure force of the press plunger, and an inner carrier portion 20 which carries the press portion 19.

The press portion 19 is subjected both to wear and to thermal stresses depending on the relatively high temperature at which the end sealing member 6 and the container sleeve 8 are welded together. Therefore, the press portion 19 should be made of a wear resistant and temperature resistant material, and at the same time it must be elastic so that the press portion can expand radially outwards and can reshape itself following any eventually existing unevenness of the lid rim like for instance wrinkles and folds which may be formed in the fold up edges or rims of the end sealing member, in particular when the end sealing member is formed by pressing a flat lid blank down through a formation ring according to known methods.

Contrary to the press portion, the carrier portion 20 is not subjected to such wear as the press portion, and in particular not to the high welding temperatures, but the carrier portion 20 is subjected to elastic strains, to friction forces while sliding over the cone surface 12 of the formation plate 3, and to relatively high press forces. Therefore the carrier portion 20 should be made of such resistant or hard material, and at the same time elastic material, as to be able to stand the high press forces. Further it should be made of a material having a relatively low coefficient of friction in order to give as little friction as possible when sliding over the cone surface 12 of the formation plate 3.

The press portion 19 preferably is formed as an endless ring which can easily be mounted on the outer edge 21 of the carrier portion 20. Thereby the press portion may easily be peeled off the carrier portion and be replaced by a new press portion, and this operation is made without the need of dismounting the press plunger in any way, and therefore the replacement of the press portion is made very quickly, simply and to a low cost. The carrier portion has a substantially longer life time than the press portion, and the total cost for renewing the press plunger in case of wear damages or in case of heat damages therefore is much less than for the in previously known apparatus of this type.

The press portion can be mounted in any suitable way on the carrier portion 20, and it is only requested that it is well connected to the carrier portion in the vertical direction. The mounting may be made in the form of an outer connection of the press portion as shown in FIG. 4 or in the form of an inner connection as shown in FIGS. 3 and 5 or in the form of a combined outer and inner connection as indicated in FIGS. 1 and 2.

Preferably the press portion 19 is made of natural rubber, fluoric rubber, hydrated nitrilic rubber, silicone rubber, any urethane elastomere or another material having a good elasticity, a good wear strength and a good heat resistance.

The carrier portion preferably is made of hard rubber or of a synthetic resin, in particual a self-lubricating resin material chosen among the group of materials consisting of for instance an amide resin, a urethane resin, a polyesther resin or another relatively hard, elastic and at the same time pressure resistant material.

The carrier portion 20 of FIGS. 1 and 2 has an outwardly successively reduced thickness, but the carrier portion 22 of FIG. 3 has an even thickness. For eliminating the risk that said carrier portion 22 buckles when the press portion 23 is pressed to the rim of the container lid the press plunger is in this case formed with a support ring 24 provided on the upper side of the carrier portion 22, and the carrier portion is in this case clamped between a lower carrier plate 25 and an upper carrier plate 26. Otherwise the structure and the function of the apparatus of FIG. 3 is the same and that of the earlier described embodiment.

Referring to FIGS. 1 and 2 the function of the apparatus is the following:

In the non-operative position both the carrier portion 20 and the press portion 19 are retracted to a position fully inside the outer edges 13 of the formation plate 3. After a container sleeve 8 has been placed in a welding cassette 9 and an end sealing member 6 has been introduced in the open end of the sleeve 8, or concurrently with introducing the the end sealing member 6 in the sleeve 8, the press plunge is moved down so that the press portion 19 of the expansion body 16 comes straight on level with the high frequency coil 10. The expansion part 2 is pressed down against the formation part 1 as indicated in FIG. 2 whereby the bottom surface 18 of the carrier part 20 slides against the upper surface 12 of the formation plate 3 and whereby the press portion 19 is moved radially outwards and presses the edges 7 of the end sealing 6 against the inner surface of the container sleeve 8. Thereafter the high frequency current is switched on, the lid and the sleeve are welded together, the current is switched off, the weld is allowed to become at least slightly cooled, and the expansion part 2 is moved back to its position spaced from the formation part 1 and a new operation cycle can be started.

We claim:

1. A press plunger for exerting radially outwardly force around the inner surface of a workpiece surrounding it, said press plunger having an expansion part (2) including a unitary resiliently deformable cup shaped expansion body (16) made from elastic material and defining an endless radially outer peripheral surface, and a formation part (1) having a formation surface (12) against which at least a portion of said expansion body (16) in the direction of said formation part (1) to expand the radially outer peripheral surface, characterized in that said press plunger includes a resiliently deformable outer press ring (19) carried by and surrounding an associated portion of said expansion body (16) and defining said outer peripheral surface, said expansion body (16) is made from one elastic material, and said outer press ring (19) is made from another elastic material.

2. Press plunger according to claim 1 including mounting means for releasably retaining said press ring (19) in assembly with said expansion body (16) for removal therefrom to facilitate replacement thereof without dismantling said press plunger.

3. Press plunger according to claim 2 characterized in that said mounting means includes a radially outwardly open annular groove in said expansion body 16 for receiving an associated portion of said press ring (19) therein.

4. Press plunger according to claim 1 characterized in that said formation surface (12) comprises a generally conical surface diverging radially outwardly and in a direction away from said expansion body (16).

5. Press plunger according to claim 4 wherein said expansion body (16) has a bottom surface 18 which slides upon said formation surface (12) when said expansion body 16 is moved in an axial direction toward said formation part and at least a portion of said bottom surface (18) complements an associated portion of said bottom surface 12.

6. Press plunger according to claim 5 characterized in that said portion of said bottom surface 18 is spaced from said associated portion of said formation surface (12) before said expansion body (16) is axially displaced in the direction of said formation part (1) to expand said radially outer peripheral surface.

7. Press plunger according to claim 1 characterized in that said one elastic material comprises rubber.

8. Press plunger according to claim 1 characterized in that said one elastic material comprises a resin.

9. Press plunger according to claim 8 characterized in that said one elastic material is selected from a group of materials consisting of amid resin, urethane resin and polyester elastomeric resin.

10. Press plunger according to claim 1 characterized in that said other elastic material comprises a wear resistant and temperature resistant material selected from a group of materials consisting of fluoric rubber, hydrodrated nitrilic rubber, silicone rubber and urethane rubber.

* * * * *